United States Patent [19]

Marcus et al.

[11] Patent Number: 4,469,365
[45] Date of Patent: Sep. 4, 1984

[54] AUTOMOTIVE SUNGLASS STORAGE SYSTEM

[75] Inventors: Konrad H. Marcus; Michael J. Cody, both of Holland, Mich.

[73] Assignee: Prince Corporation, Holland, Mich.

[21] Appl. No.: 403,062

[22] Filed: Jul. 29, 1982

[51] Int. Cl.³ ............................................... B60R 7/00
[52] U.S. Cl. .................................. 296/37.7; 296/37.8; 224/42.42; 224/311
[58] Field of Search ............... 296/37.7, 37.8, 37.1; 224/42.42 R, 282, 277, 278, 311, 312; 206/5 R, 6; 220/23

[56] References Cited

U.S. PATENT DOCUMENTS

| | | | |
|---|---|---|---|
| 1,964,339 | 6/1934 | Brassell | 296/37.7 |
| 2,236,428 | 3/1941 | Haas | 296/37.7 |
| 2,639,068 | 5/1953 | Luby | 224/311 |
| 4,275,913 | 6/1981 | Marcus | 296/37.1 |

Primary Examiner—Robert R. Song
Attorney, Agent, or Firm—Price, Heneveld, Huizenga & Cooper

[57] ABSTRACT

A storage system includes a housing secured to the ceiling of an automobile behind the windshield and has one or more recesses having hinged covers defining one or more storage receptacles for receiving and storing sunglasses or other small personal items. The housing can be conveniently aligned to extend between the vehicle operator and passenger seats such that the storage compartments are readily accessible. In one embodiment, hinge means coupling the cover and housing are curvilinear to permit the cover to swing downwardly in an arcuate path of approximately 100 degrees to facilitate the insertion and removal of items from a receptacle formed in the cover.

11 Claims, 3 Drawing Figures

AUTOMOTIVE SUNGLASS STORAGE SYSTEM

BACKGROUND OF THE INVENTION

The present invention pertains to a storage system for sunglasses and particularly one which can be mounted to the ceiling of a vehicle.

The storage of sunglasses for a vehicle operator and/or passengers can be troublesome. Typically, glasses are placed in the glove box or on the dashboard where they are either not readily accessible, can be misplaced or are subject to damage. U.S. Pat. Nos. 4,275,913 and 4,275,916 disclose sunglass storage systems which provide specific storage facilities in a vehicle to alleviate some of the existing problems. The storage structure described in these patents, however, either can interfere with the use or adjustment of a rearview mirror or require visor space which can be used for other accessories such as a lighted vanity mirror or garage door opener, and can accomodate but a single pair of sunglasses.

SUMMARY OF THE PRESENT INVENTION

The system of the present invention provides the capability of storing a plurality of sunglasses or other small items by providing a housing secured to the ceiling of an automobile behind the windshield and including therein one or more compartments having hinged covers defining one or more storage compartments for receiving and storing sunglasses or other small personal items. The housing can be conveniently aligned to extend between the vehicle operator and passenger seats such that the storage compartments are readily assessible. In one embodiment, hinge means coupling the cover and housing are curvilinear to permit the cover to swing downwardly in an arcuate path of approximately 100 degrees to facilitate the insertion and removal of items from a receptacle formed in the cover. In the preferred embodiment of the invention, the housing is longitudinally aligned in the center of the vehicle and can contain four storage compartments with two compartments being aligned between each of the seat locations in the front and rear seats of a vehicle. These and other features, advantages and objects of the present invention will become apparent upon reading the following description thereof together with reference to the accompanying drawings in which:

DETAILED DESCRIPTION OF THE PREFERRED EMBODIMENT

Figure 1:
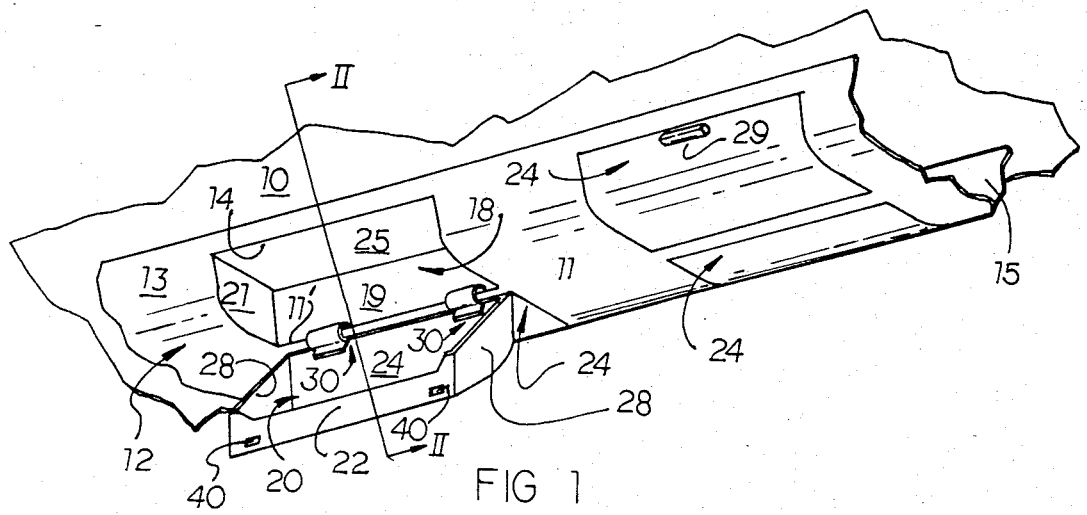
FIG. 1 is a fragmentary, perspective view of the present invention.
Figure 2:
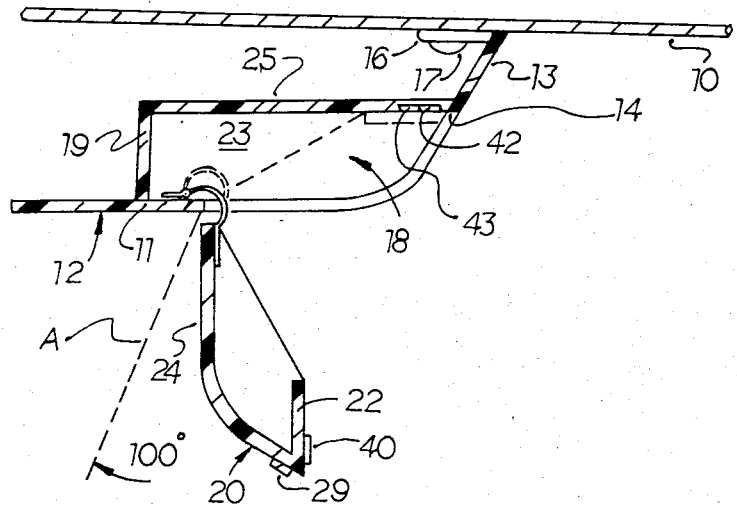
FIG. 2 is an enlarged, cross-sectional view of the invention taken along section line II—II of FIG. 1.

Referring initially to FIG. 1, there is shown the interior of a vehicle looking forwardly toward the ceiling 10 typically upholstered with a material covering the steel substructure. Extending longitudinally approximately in line with the fore and aft centerline of the vehicle is a generally U-shaped, shallow, curvilinear housing 12 which in the preferred embodiment supports four separate storage receptacles 20 with the forward storage receptacles 20 (to the left in FIG. 1) being positioned between and slightly forwardly of the front seat of a vehicle to provide access by the vehicle driver and the passenger and the rear storage receptacles 20 being positioned for easy access by rear seat passengers. The housing 12 can be molded of ABS or polycarbonate materials as an integral structure and includes, as best seen in FIG. 2, a substantially flat bottom surface 11 and upwardly curved left side and right side walls 13 and 15 respectively. A plurality of spaced mounting tabs 16 (FIG. 2) are integrally formed with walls 13 and 15 and extend inwardly for securing the housing 12 to the vehicle ceiling 10 by means of suitable fasteners 17 as required. The housing includes suitable access ports for the tabs to permit installation of the housing to threaded mounting bosses integrally included in the vehicle's roof. The front and rear ends of housing 12 are terminated with curved end walls (not shown) or housing 12 can integrally include or be coupled to other structure such as an overhead light assembly. Generally, rectangular apertures 14 are formed through the walls 13, 15 and partially through floor 11 to define, in connection with an enclosure, storage compartments 18. Compartments 18 are enclosed by a rear wall 19, side walls 21 and 23 and a ceiling 25 integrally molded into the housing.

Figure 3:
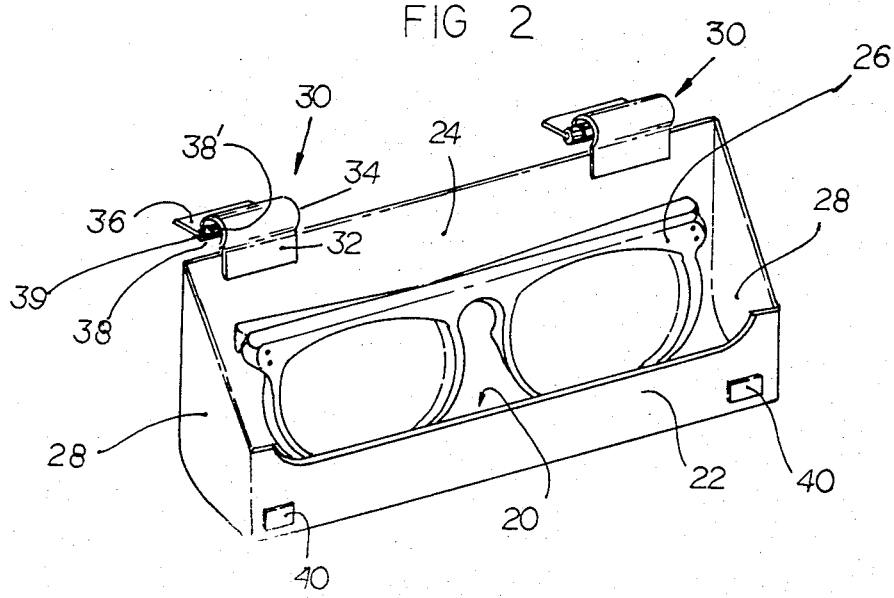
FIG. 3 is an enlarged, perspective view of the cover and receptacle showing a pair of glasses positioned therein.

All of the storage receptacles 20 which pivot into and out of compartments 18 are substantially identical such that a description of only one of the receptacles follows. The receptacles are integrally molded of ABS or polycarbonate material and include a concavely curved cover 24 conforming in curvature to the junction of floor 11 and side walls 13 or 15 of housing 12. Extending along the forward edge of cover 24 is a lip 22 used to confine personal items such as glasses 26 within the storage receptacle so defined. Extending between lip 22 and cover 24 on opposite edges are integral side walls 28. Along the rear edge near the top of cover 24 there is provided a pair of spaced hinge means 30 which in the preferred embodiment include a first flange 32 fixedly secured along the top edge of cover 24 as shown in FIGS. 2 and 3, an arcuate segment 34 integrally joined to flange 32 and extending through a circular arc of approximately 180 degrees and terminating in segmented circular section 38. A second flange 36 is pivotally coupled to the edge of arcuate segment 34 remote from flange 32 by means of integral, staggered. segmented, circular barrel sections 38 interfitted between sections 38 by a pivot pin 39. Arcuate segment 34 permits receptacle 20 and cover 24 to pivot downwardly over the edge 11' of floor 11 of housing 12 as best seen in FIG. 2, while concealing the flange 36 and hinge means 38 and 39 within the storage compartment 18. Such construction provides a clean and neat appearance for the interior of the vehicle. The cover can move through an arc of about 100 degrees as shown in FIG. 2 by dashed line A with the hinge means 30 permitting this wide opening range of cover 24 to permit easy access to the articles contained within receptacle 20.

To hold the cover 24 and storage receptacle 20 in a closed position, magnetic catch means are provided which include a pair of magnets 40 secured on the outer surface of lip 22 near opposite corners thereof and aligned to engage ferromagnetic plates 42 secured within recesses 43 (FIG. 2) formed in the ceiling 25 of the storage compartment 18. Thus, when cover 24 is moved from its open position shown in FIG. 2 to a closed position as illustrated by the rear left cover 24 in FIG. 1, and in phantom lines in FIG. 2, magnets 40 contact plate 42 and hold the storage compartment in a releasably closed position. A handle 29 integrally formed on the outer surface of cover 24 is provided to facilitate opening and closing of the storage receptacle. In the preferred embodiment receptacles 20 have a length of about 8 inches and a depth of about 2.5 inches to comfortably hold a pair of glasses therein. Housing 12 has a width of about 8 inches to accommodate longitudinally aligned storage compartments on opposite sides.

It will become apparent to those skilled in the art that various modifications to the storage system of the preferred embodiment can be made. The mounting tabs 16 shown in FIG. 2 can be located as necessary to accommodate the housing for a particular vehicle. Also, structural, laterally extending walls may be provided to add rigidity to the housing 12 and may include mounting brackets for securing the housing to the vehicle ceiling. Although in the preferred embodiment storage compartments are provided for four passenger locations, it may be desirable to provide only a storage compartment for front seat passengers, thereby providing a shortened housing 12 extending only to the back of the front seats. These and other modifications to the preferred embodiment of the invention as described herein will, however, fall within the spirit and scope of the invention as defined by the appended claims.

The embodiments of the invention in which an exclusive property or privilege is claimed are defined as follows.

1. For use in a vehicle such as an automobile, an overhead storage system for relatively small items comprising:
   a housing including means for securing said housing to the ceiling of a vehicle, said housing defined by a floor and integral side walls and including at least one aperture formed through one of said side walls to define a first storage recess,
   a cover configured to the shape of said side wall and said aperture therein and integrally including wall means defining a storage receptacle, and
   hinge means pivotally coupling an edge of said cover to an edge of said housing adjacent said aperture for permitting said cover to be moved from a closed position in which said cover wall means are positioned within said housing to an open position permitting access to said storage receptacle.

2. The apparatus as defined in claim 1 wherein said aperture extends partially into the floor of said housing and said hinge means extends between an edge of said floor adjacent said aperture and said cover to permit said cover to pivot downwardly to an open position.

3. The apparatus as defined in claim 2 and further including an enclosure within said housing to surround and enclose said aperture to define a closed compartment into which said storage receptacle extends.

4. The apparatus as defined in claim 3 wherein said housing is an elongated U-shaped member and includes a second aperture defining a second storage recess spaced from said first recess, and further including a second cover configured to the shape of said side wall and said second aperture and integrally including wall means defining a second storage receptacle and wherein said apertures are spaced to provide access to said first and second storage receptacles by a driver and a passenger of a vehicle.

5. The apparatus as defined in claim 4 wherein said apertures are formed in opposite sides of said U-shaped housing which is shaped to be longitudinally aligned with the centerline of a vehicle between the driver and passenger sides of a vehicle.

6. The apparatus as defined in claim 5 wherein said hinge means include flanges coupled by a curved segment extending through an arc of about 180 degrees.

7. The apparatus as defined in claim 6 and further including magnetic catch means extending between said cover and housing for releasably holding said cover in a closed position.

8. An overhead storage system for mounting to the ceiling of a vehicle to store relatively small items comprising:
   an elongated U-shaped housing including means for securing said housing to the ceiling of a vehicle and including aperture means formed therein to define a first pair of storage recesses on opposite sides of said housing,
   cover means for said apertures, said cover means each including wall means defining a storage receptacle, and
   hinge means pivotally coupling said cover means to said housing adjacent said aperture for permitting said cover means to be moved in a generally vertical direction from a closed position in which said wall means are positioned within said housing to an open position permitting access to said storage receptacle.

9. The apparatus as defined in claim 8 wherein said wall means includes a pair of side walls and a front lip to define an elongated receptacle shaped to hold a pair of eyeglasses therein.

10. The apparatus as defined in claim 9 and further including enclosure means positioned in said housing in alignment with said apertures to define storage compartments which receive said storage receptacles when said cover means are in a closed position.

11. The apparatus as defined in claim 10 wherein said housing further includes a second pair of apertures on opposite sides thereof and spaced from said first apertures, additional cover means for said second pair of apertures, and having wall means defining second storage receptacles and hinge means pivotally coupling said additional cover means to said housing, wherein said second pair of apertures are spaced from said first pair of apertures and said housing aligned to position said first storage receptacle for access by front seat passengers and said second storage receptacles for access by rear seat passengers.

* * * * *